Patented Sept. 8, 1953

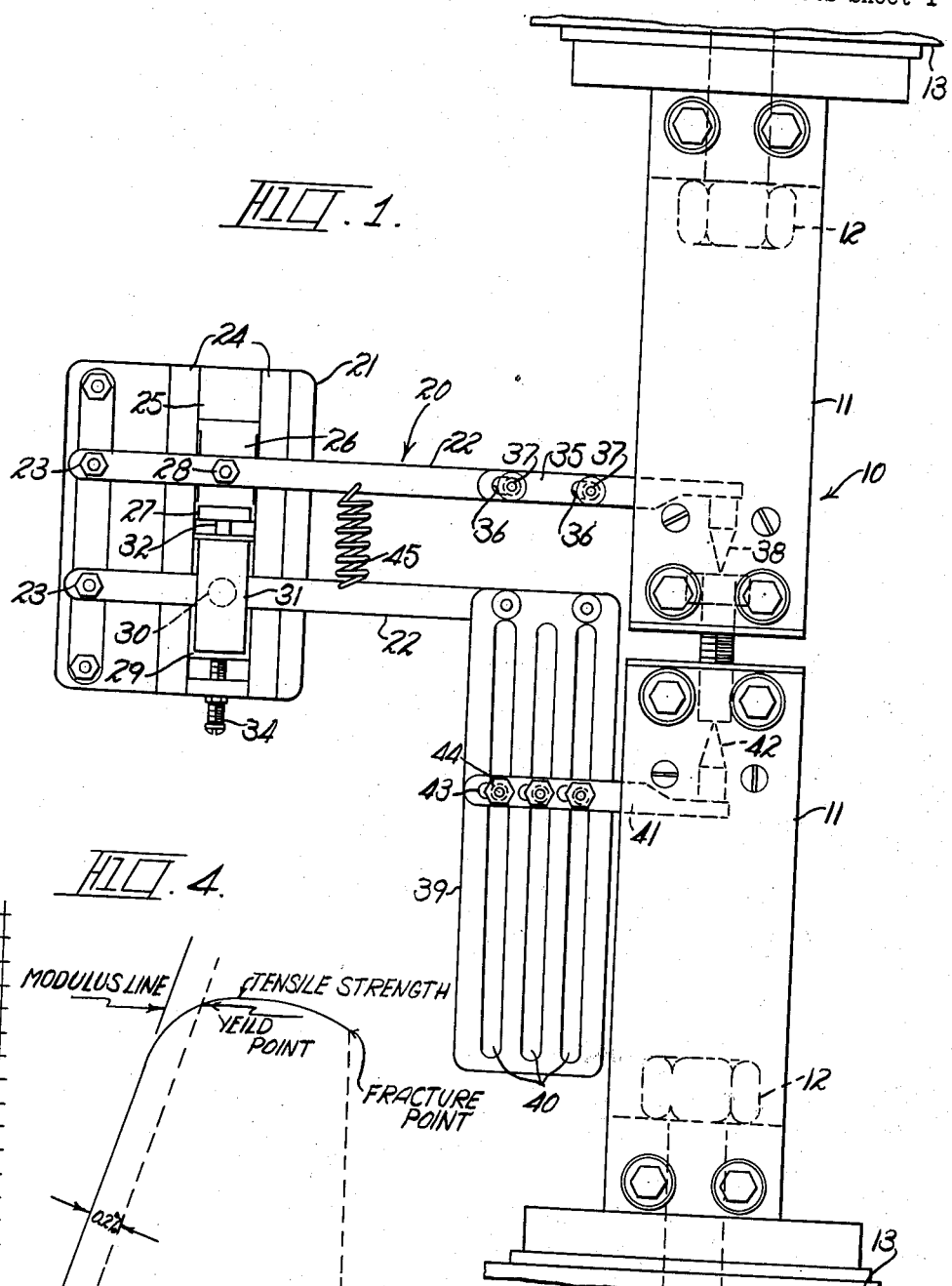

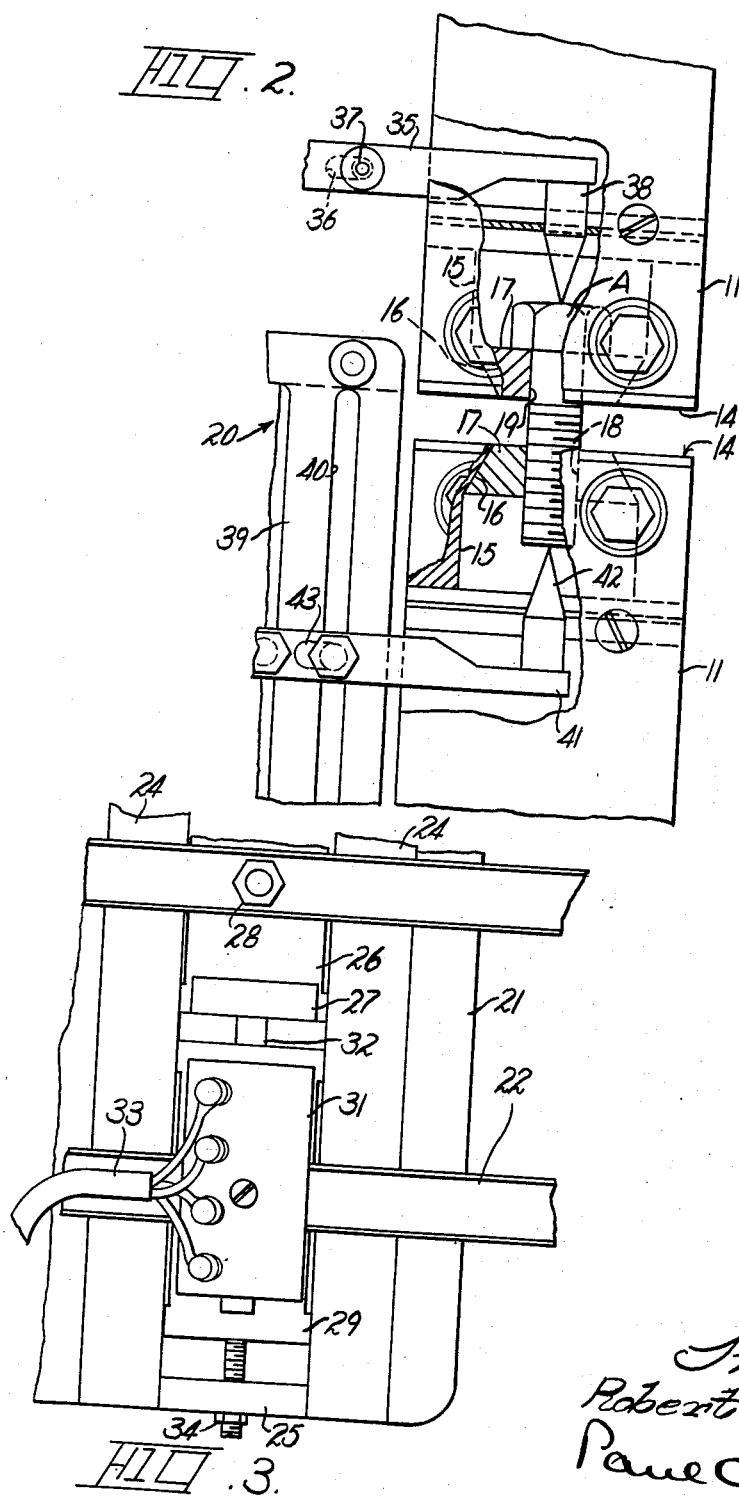

2,651,196

UNITED STATES PATENT OFFICE 2,651,196

EXTENSOMETER FOR TESTING METAL OBJECTS

Robert H. Pinkel, Chicago, Ill.

Application July 15, 1949, Serial No. 104,929

4 Claims. (Cl. 73—88.5)

The present invention relates to a testing device for testing the mechanical properties of bolts and other like objects. More specifically the invention relates to an improved extensometer which is especially adapted for determining the yield strength and elongation of metal test specimens.

In the development of metal parts such as bolts and the like it is necessary to subject various specimens to test procedures in order to determine their relative strength qualities. Elongation and yield strength must in most instances be accurately and carefully determined in order that proper comparisons may be made between specimens composed of different types of materials. A test setup for testing the strength of the materials usually consists of a pair of grips which are longitudinally positioned with respect to each other and between which a test specimen is firmly secured. The grips are moved apart by means of a conventional test press and thus the material is elongated until fracture of the specimen occurs. The point at which the metal yields in the final maximum elongation is a factor which must be determined by such a test procedure.

In the past, several different types of testing devices have been utilized, none of which have succeeded in providing the industry with an accurate and positive testing procedure.

The first of these would be the utilization of a recorder drum which would be connected by pulleys and cables to the testing apparatus. Thus upon operation of the apparatus movement would be imparted to the recorder drum and the relative displacement of various parts of the machine would result in the indication on the drum of certain strength characteristics of the test specimen. An autographic load extension could be obtained by this method but it would have inherent weaknesses that would in the final analysis result in inaccurate readings. The amount of extension in this method would not only be a function of the specimen that was tested but would be, in essence, the sum extension of all the component parts of the machine such as the grips, seats, links, and other parts utilized. It is readily apparent therefore that this type of machine would be applicable only where the values of deformation were quite large and could not be utilized for specimens having low deformation characteristics.

Another device previously utilized is a type of extensometer. This extensometer is usually attached to the grips of a testing machine. The grips upon moving would cause reaction in the extensometer. The reaction would be measured by an electrically actuated strain recorder that would also provide an autographic record or diagram.

The disadvantages with this latter type of test unit are also quite obvious. The measurement taken would be the function of many components such as the grips, the bolt threads, etc. In addition to this problem would be the problem of misalignment and realignment of the grips. During the operation of the testing machine the grips normally may become misaligned. This causes an adverse effect on the extensometer and results in a false reading on the autographic record. A modulus line drawn by this type of testing unit would be irregular, having reverse curves and other undesirable characteristics.

In determined the yield strength and elongation properties of a test specimen a conventional and accepted procedure is presently used by those skilled in the art. After the modulus line has been recorded on a chart, a line known as the "offset line" is drawn parallel to the straightest portion of the modulus line. The offset line is spaced from the modulus line and runs in parallel relation with respect thereto. The dimensional measurement of the offset line from the modulus line is 0.2% of the length of the specimen (exclusive of gripping surfaces) which is to be elongated. As the test specimen yields a load extension curve is formed tangent to the modulus line. The point of intersection of the offset line with the load extension curve is generally considered the point where the test specimen begins to permanently yield, and thus the yield point is established on the chart.

From this description then of the test procedure it is readily apparent that the modulus line must be as straight as possible in order to determine the exact portion of the line from where the offset line measurement is to be taken. With a curved or irregular line accuracy would be impossible. As indicated above, when the extensometer is fastened to the grips an irregular line results and thus the modulus line established is unsuitable for proper and accurate measurement and determination of the yield point of the specimen. It is applicant's prime object therefore to provide an improved extensometer for testing specimens in an accurate manner and to facilitate the autographic recording by a strain recorder.

It is another object to provide an improved testing device that will accurately cooperate with a strain recorder to test the elongation, yield and ultimate strength of a metal object such as a bolt.

A still further object is to provide an extensometer that is readily adapted to be connected to the opposite ends of a test specimen to be measured and whereby the elongation of the test specimen and any changes in the characteristics of the metal will be directly imparted to the extensometer.

Another object is to provide an improved gripping arrangement for a testing device such as an extensometer.

These and other objects will become more clearly apparent from a reading of the description when examined in connection with the accompanying sheets of drawings.

In the drawings:

Fig. 1 is a side elevational view showing a test unit and an extensometer.

Fig. 2 is a detail elevational view partially in section showing the relation of an extensometer with respect to a test specimen.

Fig. 3 is a detail elevational view of a mounting support for an extensometer.

Fig. 4 is a diagram showing a typical autographic recording resulting from the utilization of the applicant's extensometer when used in connection with a conventional type of strain recorder.

A testing device is generally designated by the reference character 10 as specifically shown in Fig. 1. The testing device includes a pair of longitudinally spaced grips 11. The grips 11 may be of conventional construction, a U-shaped hanger type generally being preferred. The grips 11 are connected in longitudinally aligned relation by means of bolts 12 to the platens 13 of a testing machine. The testing machine has not been disclosed since any conventional apparatus can be utilized that will exact the sufficient pressure for properly testing the elongation of the test specimen.

The grips 11 also include gripping surfaces 14. The gripping surfaces 14 are longitudinally spaced with respect to each other and include undercut portions 15. The undercut portion 15 of each grip 11 terminates in a tapered bore 16. A conical insert 17 is arranged to be secured within the tapered bore 16 of each grip. A threaded bore 18 is formed in one of the inserts 16 as best indicated in Fig. 2. The other insert is provided with a plain bore 19 through which the shank of a bolt or test specimen A is extended. The bolt A includes the usual head and the lower end of the bolt is threaded so that it may be secured into the threaded bore 18 of the insert 17.

As best indicated in Fig. 2 the bolt A is thus securely connected to the grips 11 and upon longitudinal movement of the grips 11 in a direction away from each other the bolt A would be placed under tension and thus eventual elongation would result during the operation of the testing press. The movement of the grips 11 in a direction away from each other is, of course, at a very slow rate and the pressure is constant until fracture of the metal bolt occurs.

An extensometer is positioned adjacent to the grips 11. This extensometer is generally designated by the reference character 20 and includes a support 21. The support 21 may be rigidly secured to any suitable support adjacent the testing press. The extensometer includes a pair of longitudinally extending arms 22. The arms 22 are freely pivoted as indicated at 23. A pair of track members 24 extend vertically in laterally spaced relation forming a track 25. An upper sliding block 26 is adapted to be moved vertically within the track 25. The sliding block 26 includes a contact projection 27 which extends outwardly of the block. A screw and nut 28 pivotally secure the block 26 to the upper arm 22. A lower block 29 is also positioned within the track 25 and is adapted to move therein. The lower block 29 is pivotally secured in a similar manner as the block 26 to the lower arm 22 as indicated at 30. A current control device 31 is rigidly supported by the lower arm 22. The current control device 31 includes a plunger 32. An electrical conduit 33 is suitably connected to terminals on the current control device 31. This current control device 31 is of the pressure-responsive type. In other words, as the upper and lower arms 22 pivot in a direction apart, the plunger 32, which is spring controlled, is urged outwardly against the projection 27 whereupon electrical changes occur within the current control device. Likewise when the arms 22 move toward each other during the setting up operation of the extensometer, the projection 27 engages the plunger 32 and moves the same. The device 31 is usually connected to a conventional type of electrically operated strain recorder not shown. The type of strain recorder utilized is capable of making an autographic load extension diagram in a well known manner thus producing a modulus line in response to the mechanical action of the extensometer. A set screw 34 is positioned to retain the block 29 in the track 25.

The extensometer is also provided with a contact extension 35 which is secured to the end of the upper arm 22. The contact extension 35 includes a longitudinally extending piece which is provided with slots 36. Bolts 37 are connected through the slots 36 and may be loosened and tightened for effecting longitudinal adjustment of the contact extension 35 with respect to the upper arm 22. The contact extension 35 includes a contact member 38. The contact member 38 extends substantially perpendicular with respect to the extension 35. The contact member 38 is tapered and terminates in a rounded or pointed contact end which may have point to point engagement with a test specimen in a manner which will presently be more apparent.

An adjusting plate 39 is rigidly secured to the end of the lower arm 22. The adjusting plate 39 includes a plurality of spaced vertically extending slots 40. A contact extension 41 is secured to the adjusting plate 39. The contact extension 41 also includes a contact member 42 which is rounded or pointed in the same manner as the contact member 38. The contact members 38 and 42 are positioned so that they point toward each other and they are normally placed in longitudinal alignment when they are connected to the opposite ends of a test specimen as indicated in Figs. 1 and 2. The extension 41 also includes a plurality of spaced slots 43. Bolts 44 extend through the slots 43 for rigidly securing the extension to the adjusting plate 39. The bolts 44 may be loosened for permitting lateral adjustment of the extension. A spring 45, as shown in Fig. 1, is provided for normally urging the arms 22 in a lateral direction toward one another.

As best shown in Figs. 1 and 2, the contact members 38 and 42 are positioned in substantially longitudinal alignment. The contact ends of the contact members engage opposite ends of the test specimen or bolt A pin point to point relation. The spring 45 tends to urge the contact members 38 and 42 into this position. It is especially important that the contact members be accurately aligned and for this purpose adjustment of the extensions 35 and 41 is possible. The extension 35 may be moved longitudinally with respect to the arm 22 and the extension 41 may be moved laterally and longitudinally with respect to the lower arm 22. Thus it readily can be seen that the contact members 38 and 41 may be quickly and efficiently aligned. As the testing machine moves the grips 11 apart, any elongation of the bolt A is immediately imparted to the contact points 38 and 42 which also thus are spread apart. This movement results in pivotal movements of the arms 22 in a direction away from each other. The plunger 32 may be spring biased so that it may continue to move outwardly of the current control device 31 as the arms 22 move apart. In this manner electrical impulses may be imparted from the current control device 31 of a conventional type of strain recorder. It must, of course, be understood that the strain recorder and the current control device 31 may be of various and different designs, the applicant not attempting to claim such specific constructions in this application. Applicant's invention is exemplified in the novel and efficient extensometer which is disclosed. As the elongation of the bolt A continues to take place the changes in the material structure result in elongation and thus movement is imparted to the arms 22, this movement in turn being magnified by the current control device and translated into terms of a visual record by means of the strain recorder.

It is apparent that any movement or misalignment of the grips is not magnified into movement of the extensometer and that any reaction of the extensometer is the sole result of the elongation of the bolt. It is not the sum of all the various component parts of the testing machine which is a disadvantage found in the previous types of extensometers.

The diagram shown in Fig. 4 is a sample of a diagram made my a strain follower utilizing the extensometer disclosed. As indicated, the horizontal indices or markings express total elongation whereas the vertically spaced markings indicate load applied. In the diagram shown in Fig. 4, the modulus line is shown as extending in a substantially straight line. This is accomplished by applicant's novel extensometer wherein the point to point contact of the contact members is axially on opposite sides of the specimen tested. Thus the modulus line is maintained straight and misalignment or realignment of the grips is not a vital factor or force causing irregularities in the modulus line. The offset line is positioned parallel with the modulus line and is spaced laterally with respect to it. The point of intersection of the offset line with the load extension curve indicates the point of yield as set forth in the diagram. The load extension curve then is shown as continuing to a point where it is broken off. It is at this point that the test specimen has fractured. A vertical line drawn from the end of the load extension curve to the base line permits the measuring of the full elongation of the test specimen.

The accurate measurement of the fracture point is an extremely pertinent advantage of applicant's invention. In previous extensometers, where the parts of the extensometer has been connected to the grips, it was not readily apparent whether complete fracture or failure took place in the test specimen, since the extensometer would have to be disconnected from the machine prior to this fracture failure for the reason that the extensometer might be injured by the sudden shock as the grips came apart. Since the extensometer would thus have to be disconnected from the testing machine before final fracture took place, an incomplete load extension curve was secured and determination of the full elongation was not possible. By the novel design shown a full and accurate determination of the elongation is possible. It can readily be seen now that applicant has developed a novel extensometer which can be directly located on the ends of a test specimen and thus will give an accurate picture of the material strength of a test specimen. With the utilization of this novel extensometer and a conventional type of strain follower, an accurate and straight modulus line is obtained. Thus by the use of the conventional 0.2% offset method, the elongation, yield strength, and ultimate tensile strength of a test specimen may be accurately determined.

It must be understood that changes and modifications may be made in this extensometer which do not depart from the spirit of the invention as disclosed nor the scope thereof as defined in the appended claims.

What is claimed is:

1. For a testing device having a pair of testing grips, and means connecting a test specimen to the grips, the grips being relatively movable for elongating the specimen; an extensometer for measuring the elongation of the specimen, said extensometer including a support, a pair of longitudinally extending arms mounted on said support, means pivotally connecting one of said arms to said support for relative lateral movement with respect to the other arm, a contact member on each arm, each contact member including a sloping surface terminating in a contact end, the contact end of one contact member facing the contact end of the other, means connected to the arms for biasing the contact members into point to point engagement with opposite ends of a test specimen whereby the contact members and the arms are moved in direct response to the stretching of the specimen, means on the extensometer for adjusting the contact members whereby the contact members may be moved into longitudinal alignment with respect to each other and a specimen to be tested, current control means carried by said support and means on one of said arms for actuating said current control means in response to longitudinal movement of one contact member with respect to the other.

2. For a testing device for bolts and the like having a pair of testing grips, the grips being relatively movable in a longitudinal direction, and means for securing a test specimen to said grips; an extensometer positioned adjacent the grips, said extensometer including a supporting member, first and second arms pivotally supported on the supporting member, said arms having end portions movable laterally away from each other, a current control device supported on the supporting member, means on one of the arms engaged by the current control device during movement of said arm, a contact extension connected to the first arm, said contact extension being relatively adjustable in a longitudinal direction with respect to the first arm, a second contact extension carried on the second arm, and a contact member on each contact extension, each contact member being arranged to engage opposite ends of a test specimen in axially aligned relation whereby changes in the length of the test 3. For a testing device for bolts and the like having a pair of testing grips, each grip including a gripping surface, the grips being relatively movable whereby the gripping surfaces are movable in a longitudinal direction away from each other, each gripping surface including an opening, the openings being in substantially axial adjustment, and an insert secured in each opening, each insert being arranged and constructed to secure a test specimen between the gripping surfaces of the grips; an extensometer positioned adjacent the grips, said extensometer including a supporting member, first and second arms pivotally supported on the supporting member, the arms extending in a direction toward the grips, said arms having end portions movable laterally away from each other, a pressure responsive current control device on one of said arms, means on the other arm actuating the current control device during respective lateral movement of said arms, a contact extension connected to the first arm, said contact extension being relatively adjustable in a longitudinal direction with respect to the first arm, an adjusting plate carried by the second arm, a second contact extension carried on said adjusting plate, means connecting said second contact extension to said adjusting plate to provide for relative lateral and longitudinal adjustment of the second contact extension with respect to the second arm, and a pointed contact member on each contact extension, each contact member being arranged to engage opposite ends of a test specimen in axially aligned pinpoint relation whereby changes in the length of the test specimen in response to movement of said grips imparts relative movement to said contact members.

4. For a testing device for bolts and the like, the device having a pair of testing grips adapted to engage spaced portions of a test specimen, the grips being relatively movable longitudinally away from each other; an extensometer positioned adjacent the grips, said extensometer including a supporting member, first and second arms pivotally supported on said supporting member, said first and second arms having end portions movable laterally toward and away from each other, a current control device carried by said supporting member adjacent said arms, means on one of said arms for actuating the control device during movement of one of said arms, a first contact member on the first arm, said first contact member extending laterally toward the second arm, a contact extension, means adjustably connecting said contact extension to said second arm whereby said contact extension may be moved longitudinally with respect to said second arm, a second contact member on the contact extension, said second contact member extending laterally toward the first contact member, the contact members being arranged to engage opposite ends of a test specimen in axially aligned relation whereby changes in the length of a test specimen in response to movement of said grips imparts relative movement to said contact members.

ROBERT H. PINKEL.

References Cited in the file of this patent
UNITED STATES PATENTS

| Number | Name | Date |
|---|---|---|
| 1,122,289 | Loveland | Dec. 29, 1914 |
| 1,279,340 | Hayes et al. | Sept. 17, 1918 |
| 1,496,803 | Amsler | June 10, 1924 |
| 1,912,213 | Nicolson | May 30, 1933 |
| 2,030,464 | Nilson | Feb. 11, 1936 |
| 2,061,261 | Walter | Nov. 17, 1936 |
| 2,176,016 | Sivertsen | Oct. 10, 1939 |
| 2,242,011 | Malmberg | May 13, 1941 |